United States Patent
Cain et al.

(10) Patent No.: US 9,619,345 B2
(45) Date of Patent: Apr. 11, 2017

(54) APPARATUS FOR DETERMINING FAILURE CONTEXT IN HARDWARE TRANSACTIONAL MEMORIES

(75) Inventors: Harold W Cain, Katonah, NY (US); Bradly G Frey, Austin, TX (US); Hung Q Le, Austin, TX (US); Cathy May, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 801 days.

(21) Appl. No.: 13/615,241

(22) Filed: Sep. 13, 2012

(65) Prior Publication Data

US 2014/0075131 A1    Mar. 13, 2014

(51) Int. Cl.
   *G06F 11/14* (2006.01)
   *G06F 11/07* (2006.01)
   *G06F 9/46* (2006.01)

(52) U.S. Cl.
   CPC .......... *G06F 11/1474* (2013.01); *G06F 9/466* (2013.01); *G06F 9/467* (2013.01); *G06F 11/073* (2013.01); *G06F 11/0778* (2013.01)

(58) Field of Classification Search
   CPC .... G06F 9/467; G06F 11/0703; G06F 11/073; G06F 11/0766; G06F 11/0778; G06F 11/30
   USPC ......................................................... 712/227
   See application file for complete search history.

(56) References Cited

U.S. PATENT DOCUMENTS

| | | | |
|---|---|---|---|
| 7,409,587 B2 | 8/2008 | Perry | |
| 8,001,421 B2 | 8/2011 | Wang et al. | |
| 8,180,980 B2 | 5/2012 | Biles et al. | |
| 8,225,139 B2 | 7/2012 | Nussbaum et al. | |
| 2006/0026579 A1* | 2/2006 | Gardner | G06F 11/362 717/151 |
| 2007/0005323 A1 | 1/2007 | Patzer et al. | |
| 2010/0131953 A1* | 5/2010 | Dice | G06F 9/466 718/101 |
| 2010/0169894 A1 | 7/2010 | Sheaffer et al. | |
| 2010/0332901 A1 | 12/2010 | Nussbaum et al. | |
| 2011/0066831 A1 | 3/2011 | Blundell et al. | |
| 2011/0307689 A1* | 12/2011 | Chung et al. | 712/234 |
| 2012/0005461 A1 | 1/2012 | Moir et al. | |
| 2012/0084477 A1* | 4/2012 | Arndt | G06F 13/24 710/266 |

OTHER PUBLICATIONS

Karl L. Jungkvist et al., Early Results Using Hardware Transactional Memory for High-Performance Computing Applications, 5 pages, Jan. 1, 2010.

(Continued)

*Primary Examiner* — Andrew Caldwell
*Assistant Examiner* — Michael Metzger
(74) *Attorney, Agent, or Firm* — Brian F. Russell; Bryan Bortnick

(57) ABSTRACT

A processor core includes a transactional memory that stores information corresponding to a plurality of transactions executed by the processor core, and a transaction diagnostic register. The processor core retrieves context summary information from at least one register of the processor core. The processor core stores the context summary information of aborted transactions into the transactional memory or the transaction diagnostic register. The context summary information can be used for diagnosing the aborted transactions.

16 Claims, 3 Drawing Sheets

(56) References Cited

OTHER PUBLICATIONS

Goetz Graefe and Harumi Kuno, Definition, Detection, and Recovery of Single-Page Failures, a Fourth Class of Database Failures, 10 pages, Mar. 2012.
Cain et al. "Determining Failure Context in Hardware Transactional Memories" U.S. Appl. No. 13/781,658, filed Feb. 28, 2013, Non-Final Office Action dated May 20, 2015.
Cain et al. "Determining Failure Context in Hardware Transactional Memories" U.S. Appl. No. 13/781,658, filed Feb. 28, 2013, Final Office Action dated Oct. 23, 2015.
Cain et al. "Determining Failure Context in Hardware Transactional Memories" U.S. Appl. No. 13/781,658, filed Feb. 28, 2013, Advisory Action dated Mar. 17, 2016.
Cain et al. "Determining Failure Context in Hardware Transactional Memories" U.S. Appl. No. 13/781,658, filed Feb. 28, 2013, Non-Final Office Action dated Jun. 27, 2016.
Cain et al. "Determining Failure Context in Hardware Transactional Memories" U.S. Appl. No. 13/781,658, filed Feb. 28, 2013, Notice of Allowance dated Dec. 9, 2016.

\* cited by examiner

APPARATUS FOR DETERMINING FAILURE CONTEXT IN HARDWARE TRANSACTIONAL MEMORIES

BACKGROUND

The present invention relates generally to computer systems. More particularly, the present invention relates to processors that use hardware transactional memories in computer systems.

In computer systems, parallel or concurrent programming can be implemented in form of transactions that involve executing a set of instructions in an atomic and isolated manner. A programmer can specify a group of instructions as a transaction for execution thereof. In atomic execution, either all instructions of the transaction are executed as a single atomic block, or none are executed. For instance, in case of a transaction that includes 10 instructions executing sequentially, if an error occurs at the fifth instruction resulting in an abort condition, the first through fourth instructions which have already been executed are also aborted along with the remaining instructions. When the transaction is aborted, the architecture of the computer system is restored to its original state. Restoring the architecture of the computer system involves restoring contents of all registers and memory blocks used during the execution of the transaction.

Transactional execution helps in managing shared memory access of transactional memories in a parallel programming environment. Transactional execution can be implemented in two ways—by using a hardware transactional memory (HTM) and by using a software transactional memory (STM). HTM is implemented in the processor hardware and a transaction using HTM is committed to a system memory only after the transaction is completed. STM is implemented in software and intermediate results generated during the execution of the transaction, along with the final results of the transaction, are stored in the system memory before the transaction is committed. Once the transaction is executed, the results of the transaction that are already stored in the system memory are marked as committed. HTM transactions are increasingly being used because of quicker turnaround times and fewer storage requirements.

In case of a computer system executing a transaction using HTM, if the transaction is aborted due to an error in one instruction, detecting the source of the error is important to debug the transaction. In HTM, the transaction is committed only after the completion of the execution and therefore no intermediate values are available to analyze the source of the error. Lack of explicit information about the error and its context in the transaction makes it difficult for programmers to debug large transactions.

It would be desirable to record information about the source and cause of the error in the transaction, so that the programmers can be provided with a context of the error to debug the transaction. This would be helpful to the programmers in debugging the transaction, especially in debugging large transactions.

Therefore, it would be advantageous to have a system and method for diagnosis of a failure of an aborted transaction, which records information about the aborted transaction.

BRIEF SUMMARY

In an embodiment of the present invention, a method for diagnosing an aborted transaction from a plurality of transactions executed by a processor core is provided. The processor core includes a transactional memory that stores information corresponding to the plurality of transactions. Context summary information is retrieved from at least one register of the processing unit. The context summary information includes at least one of a processor privilege level, a transaction nesting level, a storage class key, a calling context summary, and a register window level corresponding to the aborted transaction. The context summary information of the aborted transaction is stored into one of a transaction diagnostic register and the transactional memory and is used for diagnosing the aborted transaction.

In another embodiment of the present invention, a processor core is provided. The processor core includes a transactional memory that stores information corresponding to a plurality of transactions executed by the processor core, and a transaction diagnostic register. The processor core retrieves context summary information from at least one register of the processing unit. The context summary information includes at least one of a processor privilege level, a transaction nesting level, a storage class key, a calling context summary, and a register window level of the aborted transaction. Further, the processor core stores the context summary information of the plurality of aborted transactions into one of the transactional memory and the transaction diagnostic register. The context summary information can then be used for diagnosing the aborted transaction.

BRIEF DESCRIPTION OF THE SEVERAL VIEWS OF THE DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION

Figure 1:
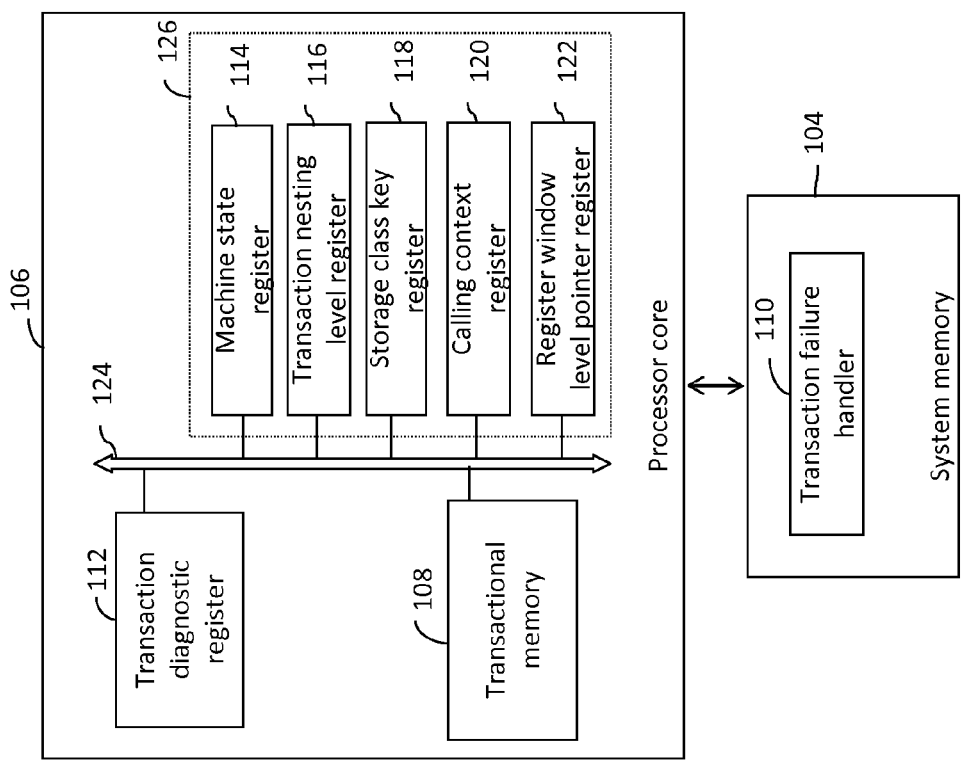
FIG. 1 is a schematic block diagram of a system for diagnosing an aborted transaction from a plurality of transactions executed by a processing core, in accordance with an embodiment of the present invention.

As used in the specification and claims, the singular forms "a", "an" and "the" include plural references unless the context clearly dictates otherwise. For example, the term "an article" may include a plurality of articles unless the context clearly dictates otherwise.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of method steps and system components related to computer implemented method for diagnosing an aborted transaction from a plurality of transactions executed by a processor core. Accordingly, the system components and the method steps have been represented where appropriate by conventional symbols in the drawings, showing only specific details that are pertinent for an understanding of the present invention so as not to obscure the disclosure with details that will be readily apparent to those with ordinary skill in the art.

While the specification concludes with the claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Referring now to FIG. 1, a schematic block diagram of a system for diagnosing an aborted transaction from a plurality of transactions executed by a processing unit, in accordance with an embodiment of the present invention, is shown. The system 100 includes a processor core 106 that is in communication with a system memory 104. The processor core 106 includes a group of registers 126, a transactional memory 108, a transaction diagnostic register 112, and a system interconnect 124. In an embodiment of the present invention, the group of registers 126 includes a machine state register 114, a transaction nesting level register 116, a storage class key register 118, a calling context register 120 and a register window level pointer register 122. The group of registers 126 is updated at regular intervals with information about a plurality of transactions being executed by the processor core 106. The system memory 104 includes a transaction failure handler 110. In an embodiment of the present invention, the transaction failure handler 110 is cached within the processor core 106 at an appropriate memory location, such as the transactional memory 108.

The system interconnect 124 may be implemented, for example, as a bused interconnect, a switched interconnect or a hybrid interconnect. The system memory 104 may be implemented as a static RAM (SRAM), a dynamic RAM (DRAM), a FLASH memory, or a virtual memory on disk.

A skilled artisan will appreciate that in various implementations of the transactional memory 108, the transactional memory 108 may include a store-through level one (L1) cache within and private to the processor core 106 and a respective store-in level two (L2) cache for the processor core 106. In order to efficiently handle multiple concurrent memory access requests to cacheable addresses, each L2 cache can be implemented with multiple L2 cache slices, each of which handles memory access requests for a respective set of real memory addresses. Additional levels (L3, L4, etc.) of on-chip or off-chip, private or shared, in-line or look aside cache, which may be fully inclusive, partially inclusive, or non-inclusive of the contents of the L1 and L2 cache memories, may also be a part of the transactional memory 108.

The system 100 of FIG. 1 may include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to systems of diverse architectures and are III no way limited to the generalized system architecture illustrated in FIG. 1.

The transactional memory 108, in addition to memory storage also includes a control logic (hereinafter referred to as the TM logic) that coordinates execution of multiple transactions in the transactional memory 108. The TM logic controls the sequencing of a transaction and provides a pass/fail indication and an optional transaction killed indication to the processor core 106. Pass/fail indication indicates to the processor core 106, whether or not the transaction successfully committed to the transactional memory 108, on completion. TM kill indication indicates to the processor core 106 whether or not a conflict has occurred during the transaction. In response to TM logic asserting TM kill indication for the transaction, the processor core 106 may, as a performance optimization, optionally abort the transaction or restart the execution of the transaction.

In response to the pass/fail indication (or optionally the TM kill indication) indicating that a conflict has occurred during execution of the transaction, the architecture of the processing unit 102 is restored to its original state and the transaction failure handler 110 takes control from the TM logic. The transaction failure handler 110 retrieves the context summary of the aborted transaction from the group of registers 126 and stores it into the transaction diagnostic register 112. It should be noted that the aborted transaction may be detected by using various other detection methods known in the art, and the illustrated exemplary process does not restrict the scope of the present invention in any way.

The context summary information of the aborted transaction includes a processor privilege level, a transaction nesting level, a storage class key, a calling context summary, and a register window level of the aborted transaction. The processor privilege level of a transaction defines the access permission of a program being executed at the time of failure of the transaction. Transaction nesting level is a counter that keeps track of the nesting level of transactions being executed by the processor core 106. For example, when no transactions are being executed by the processor core 106, the transaction nesting level counter is maintained at 0. When a transaction is started, the transaction nesting level counter is incremented to 1. If a second transaction is started inside the first transaction (i.e., the second transaction is nested within the first transaction), the transaction nesting level counter is incremented by 1. When the transaction ends, the transaction nesting level counter is decremented by 1. Storage class key refers to one or more unique ids that indicate an ability of a program executing on the cord processor core 106, to access various memory locations on the transactional memory 108 and the system memory 104, which cannot be accessed without possessing an associated key. The calling context summary is a summary of the "calling context" at the time of the failure of the transaction, wherein the calling context refers to the current call stack. For example, given a program with a function main ( ), that calls function foo ( ) that calls function bar ( ), if the failure of the transaction is determined while executing the function bar ( ), the calling context summary would be "main, foo, bar". The calling context may be recorded in a lossless format in a register, or may be encoded in some way, for example by using an XOR logic function at the address of the entry point to each function. Register window level refers to a register window being accessed during the failure of the transaction. The processor privilege level, the transaction nesting level, the storage class key, the calling context summary, and the register window level of the aborted transaction are stored in the machine state register 114, the transaction nesting level register 116, the storage class key register 118, the calling context register 120, and the register window level pointer register 122 of the group of registers 126, respectively.

On receiving an indication of the aborted transaction, the processor core 106 retrieves the processor privilege level, the transaction nesting level, the storage class key, the calling context summary, and the register window level of the aborted transaction from the machine state register 114, the transaction nesting level register 116, the storage class key register 118, the calling context register 120, and the register window level pointer register 122 of the processor core 106, respectively. After retrieving the context summary information, the transaction failure handler 110 stores the context summary information into the transaction diagnostic register 112.

Figure 2:
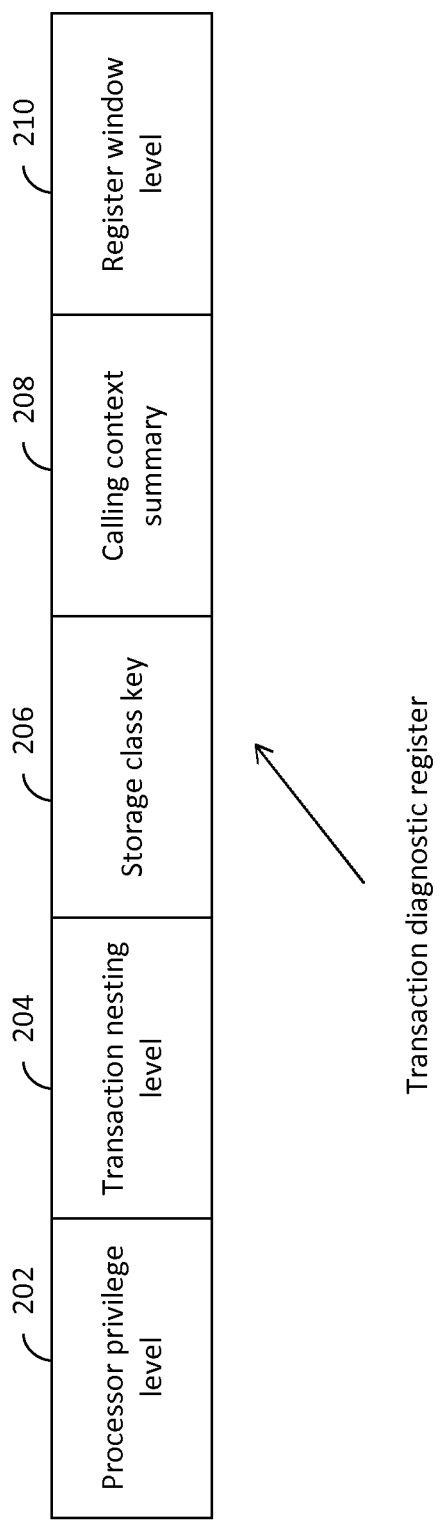
FIG. 2 is an schematic diagram of a transaction diagnostic register storing context summary information of an aborted transaction, in accordance with an embodiment of the present invention.

Referring now to FIG. 2, a schematic diagram of the transaction diagnostic register 112, in accordance with an embodiment of the present invention, is shown. The transaction diagnostic register 112 includes a processor privilege level field 202, a transaction nesting level field 204, a storage class key field 206, a calling context summary field 208, and a register window level field 210 that store the processor privilege level, the transaction nesting level, the storage class key, the calling context summary, and the register window level of the aborted transaction, respectively. It will be apparent to a skilled artisan that the context summary information may be stored in the transaction diagnostic register 112 by using various suitable ways depending on the hardware architecture used, without departing from the scope and spirit of the present invention. In an embodiment of the present invention, the context summary information of the aborted transaction may include a stack pointer, a link register summary and a transaction memory priority, which may be stored in at least one register of the processor core 106 and which may be retrieved and stored into the transaction diagnostic register 112, by the transaction failure handler 110. A stack pointer refers to a last accessed address on top of the stack at the time of the execution of the aborted transaction. The stack pointer may be stored into the transaction diagnostic register 112. The link register summary refers to the return address of a function that called another currently executing function of the aborted transaction. The transaction memory priority refers to a prioritization level of the aborted transaction.

The transaction failure handler 110 accesses the transaction diagnostic register 112 for diagnosing the aborted transaction. In an embodiment of the present invention, the transaction failure handler 110 presents the context summary information to a programmer of the system 100 for debugging. In another embodiment of the present invention, the context summary information may be fed to an automated testing or debugging tool connected to the system 100.

In an alternative embodiment of the present invention, the transaction failure handler 110 retrieves the context summary information of the aborted transaction and stores it in the system memory 104. A memory controller (not shown) is coupled to the system interconnect 124 to provide an interface for communication between the processing unit 102 and the system memory 104. The context summary information in the system memory 104 is then accessed for diagnosing the aborted transaction.

The above mentioned process is repeated for a plurality of aborted transactions and thus, the plurality of aborted transactions is diagnosed.

Figure 3:
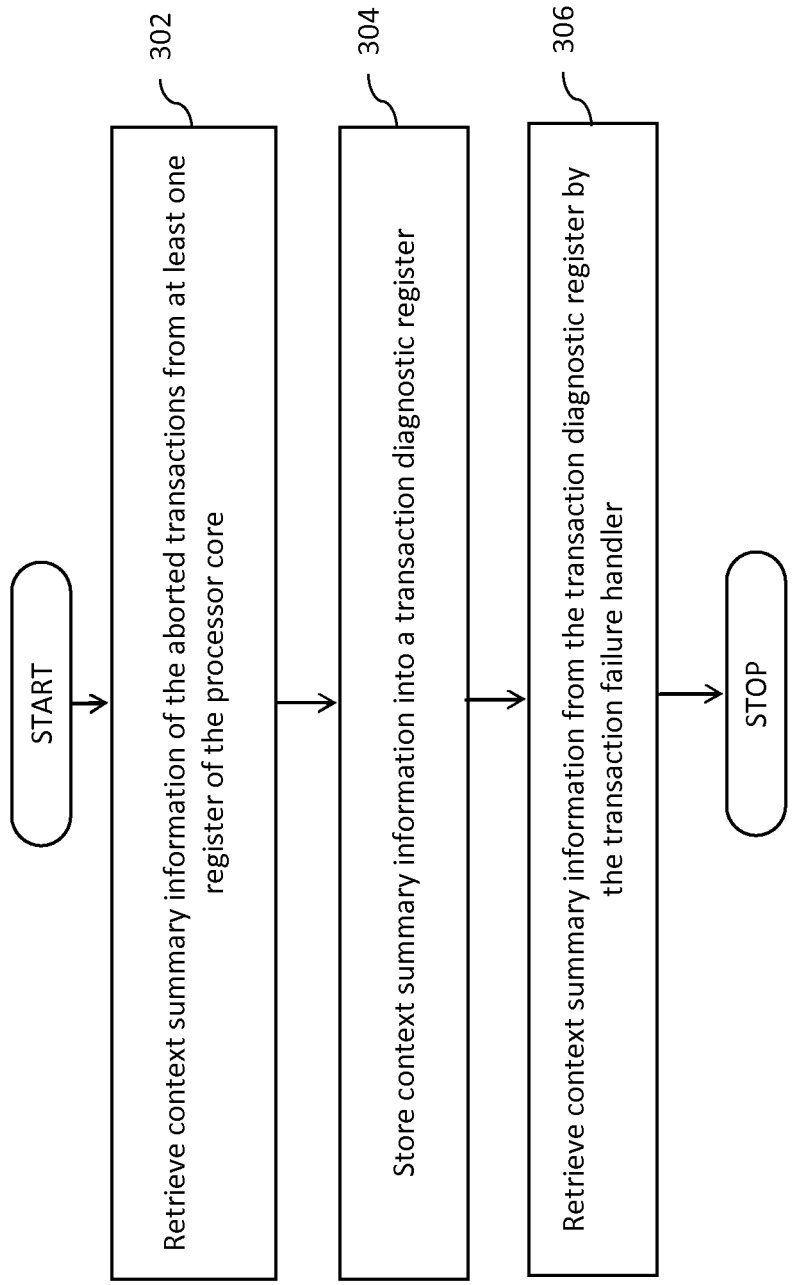
FIG. 3 is a flowchart depicting a method for diagnosing an aborted transaction from a plurality of transactions executed by a processing core, in accordance with an embodiment of the present invention.

Referring now to FIG. 3, a flowchart depicting a method for diagnosing an aborted transaction from a plurality of transactions executed by the processor core 106, in accordance with an embodiment of the present invention, is shown. Steps of FIG. 3 are explained in conjunction with FIG. 1. At step 302, the transaction failure handler 110 retrieves the context summary information of the aborted transaction from the group of registers 126. The context summary information includes the processor privilege level, the transaction nesting level, the storage class key, the calling context summary, and the register window level of the aborted transaction. At step 304, the context summary information is stored into in to the transaction diagnostic register 112 of the processor core 106. At step 306, the transaction failure handler 110 accesses the transaction diagnostic register 112 for diagnosing the aborted transaction. Thus, the context summary information of the aborted transaction is used to diagnose the aborted transaction.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A processor core comprising:
   a transactional memory that stores information corresponding to a plurality of memory transactions executed by the processor core; and
   a transaction diagnostic register; and
   a separate plurality of registers;
   wherein the processor core is configured to:
     retrieve context summary information of an aborted atomic memory transaction from multiple of the plurality of registers in the processor core, wherein the context summary information of the aborted atomic memory transaction includes (1) a transaction nesting level indicating how many transactions started within the aborted atomic memory transaction were being executed at failure of the aborted atomic memory transaction and (2) a calling context summary identifying multiple functions in a call stack at failure of the aborted atomic memory transaction; and store the context summary information of the aborted atomic memory transaction retrieved from the plurality of registers into one of the transactional memory and the transaction diagnostic register, such that the context summary information is used for diagnosing the aborted atomic memory transaction.

2. The processor core of claim 1, wherein the processor core is further configured to retrieve the context summary information from one of the transactional memory and the transaction diagnostic register and to diagnose the aborted atomic memory transaction utilizing the context summary information.

3. The processor core of claim 1, wherein the context summary information further includes at least a processor privilege level.

4. The processor core of claim 1, wherein the context summary information further includes at least a storage class key.

5. The processor core of claim 1, wherein the context summary information further includes a register window level identifying a register window being accessed during failure of the aborted atomic memory transaction.

6. The processor core of claim 1, wherein the processor core is configured to store the context summary information in the transaction diagnostic register.

7. The processor core of claim 1, wherein the context summary information of the aborted atomic memory transaction further includes a processor privilege level and a storage class key.

8. The processor core of claim 7, wherein the context summary information of the aborted atomic memory transaction further includes a register window level identifying the register window being accessed during failure of the aborted atomic memory transaction.

9. A computer program product for diagnosing an aborted atomic memory transaction among a plurality of memory transactions executed by a processor core of a computer, wherein the processor core includes a transaction diagnostic register and a separate plurality of registers and has an associated transactional memory that stores information corresponding to the plurality of memory transactions, the computer program product comprising:

a memory;

a transaction failure handler stored within the memory and executable by the processor core of the computer, wherein the transaction failure handler, when executed by the processor core, causes the computer to perform:

retrieving context summary information of the aborted atomic memory transaction from multiple of the plurality of registers in the processor core, wherein the context summary information of the aborted atomic memory transaction includes (1) a transaction nesting level indicating how many transactions started within the aborted atomic memory transaction were being executed at failure of the aborted atomic memory transaction and (2) a calling context summary identifying multiple functions in a call stack at failure of the aborted atomic memory transaction; and storing the context summary information of the aborted atomic memory transaction retrieved from the plurality of registers into one of a transaction diagnostic register and the transactional memory, such that the context summary information is used for diagnosing the aborted atomic memory transaction.

10. The computer program product of claim 9, wherein the transaction failure handler, when executed, further causes the computer to perform:

retrieving the context summary information from one of the transactional memory and the transaction diagnostic register and diagnosing the aborted atomic memory transaction utilizing the context summary information.

11. The computer program product of claim 9, wherein the transaction failure handler, when executed, causes the computer to store the context summary information in the transaction diagnostic register.

12. The computer program product of claim 9, wherein the context summary information further includes at least a processor privilege level in addition to the calling context summary and the transaction nesting level.

13. The computer program product of claim 9, wherein the context summary information further includes at least a storage class key.

14. The computer program product of claim 9, wherein the context summary information further includes a register window level identifying a register window being accessed during failure of the aborted atomic memory transaction.

15. The computer program product of claim 9, wherein the context summary information of the aborted atomic memory transaction further includes a processor privilege level and a storage class key.

16. The computer program product of claim 15, wherein the context summary information of the aborted atomic memory transaction includes a register window level identifying the register window being accessed during failure of the aborted atomic memory transaction.

* * * * *